US006414293B1

(12) United States Patent
Oliver

(10) Patent No.: US 6,414,293 B1
(45) Date of Patent: Jul. 2, 2002

(54) OPTICAL POSITION SENSING DEVICE AND METHOD USING A CONTOURED TRANSPARENT SHEET

(75) Inventor: Thomas C. Oliver, Windsor, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/439,205

(22) Filed: Nov. 12, 1999

(51) Int. Cl.⁷ ............................................... H01L 27/00
(52) U.S. Cl. .................................... 250/208.1; 250/221
(58) Field of Search .............................. 250/221, 222.1, 250/208.1, 234, 235; 358/473; 345/163, 166

(56) References Cited

U.S. PATENT DOCUMENTS

| 4,797,544 A | * | 1/1989 | Montgomery et al. ...... 250/221 |
| 4,949,391 A | * | 8/1990 | Faulkerson et al. ......... 382/313 |
| 5,015,070 A | * | 5/1991 | Montgomery et al. ...... 359/851 |
| 5,075,558 A | * | 12/1991 | Nakagawa .................. 250/556 |
| 5,552,597 A | | 9/1996 | McConica .................. 250/234 |
| 5,578,813 A | | 11/1996 | Allen et al. ............... 250/208.1 |
| 5,644,139 A | | 7/1997 | Allen et al. ................. 250/557 |
| 5,646,394 A | | 7/1997 | Steinle et al. ............. 250/208.1 |
| 5,646,402 A | | 7/1997 | Khovaylo et al. .......... 250/234 |
| 5,723,859 A | | 3/1998 | Kerschner et al. .......... 250/234 |

* cited by examiner

Primary Examiner—Stephone Allen
Assistant Examiner—Eric Spears

(57) ABSTRACT

A method and system for determining the position of a first object relative to a second object are disclosed. The method comprises providing a sheet having has a first surface, a second surface, and at least one optically detectable feature. The second surface of the sheet is placed adjacent a surface of the second object. The method further comprises providing an imaging system fixedly associated with the first object. The imaging system is placed adjacent the sheet first surface and is moved along with the first object relative to the sheet. The imaging system images planar portions of the sheet, including the optically detectable feature. Additionally, the imaging system identifies the locations of the optically detectable feature relative to the imaging system as the first object and the imaging system are moved relative to the sheet. The imaging system measures the amount and direction of the relative movement between the imaging system and the optically detectable feature. The relative movement between the first object and the second object is then readily determined, which in turn, yields the position of the first object relative to the second object.

27 Claims, 3 Drawing Sheets

OPTICAL POSITION SENSING DEVICE AND METHOD USING A CONTOURED TRANSPARENT SHEET

FIELD OF THE INVENTION

The present invention generally relates to position sensing devices and methods and, more particularly, to a position sensing device and method incorporated into an optical scanning device for determining the position of the optical scanning device relative to a smooth surface.

BACKGROUND OF THE INVENTION

Hand-held scanning devices are portable imaging devices that generate machine-readable image data, (which may be referred to herein simply as "image data") representative of an image of an object. Generating image data representative of an image of an object is sometimes referred to as "imaging" or "scanning" the object. Some scanning devices generate image data representative of a narrow "scan line" portion of the object being imaged. During the imaging process, the scanning device is moved relative to the object being imaged. As the scanning device is moved relative to the object, the scanning device generates image data representative of a plurality of sequential scan line portions of the image of the object. The image of the object is, accordingly, represented by image data of the cumulation of sequential scan line portions, similar to the image of the object represented by a conventional video display.

Examples of hand-held scanning devices are described in the following United States patents and patent applications, which are all hereby incorporated by reference for all that is disclosed therein: U.S. Pat. No. 5,552,597 of McConica for HAND-HELD SCANNER HAVING ADJUSTABLE LIGHT PATH; U.S. Pat. No. 5,646,394 of Steinle for IMAGING DEVICE WITH BEAM STEERING CAPABILITY; U.S. Pat. No. 5,646,402 of Khovaylo et al. for EXPANDABLE HAND-HELD SCANNING DEVICE; U.S. Pat. No. 5,723,859 of Kerschner et al. for LINE CONTACT HAND-HELD SCANNING DEVICE AND METHOD HAVING A LIGHT PATH SUBSTANTIALLY PERPENDICULAR TO THE ORIENTATION OF THE OBJECT AT A LINE PORTION; Ser. No. 09/120,641 (U.S. Pat. No. 6,043,503) of Sims et al. for HAND HELD SCANNING DEVICE filed on Jul. 29, 1998; and Ser. No. 09/120, 637 (now abandoned) of Sims et al. for HAND HELD SCANNING DEVICE filed on Jul. 30, 1998.

In some scanning devices, the image of the scan line portion of the object is focused onto a linear array of photodetector elements, sometimes referred to herein simply as photodetectors. The photodetectors may, as an example, be mounted to a plurality of linearly arranged electronic segments such as "contact image sensors" as are known in the art. The photodetectors may also be etched into a single semiconductor as is common with a charge-coupled device. The individual photodetectors generate image data representative of discrete portions of the image of the scan line portion of the object. The image data may, as an example, be voltages wherein a relatively high voltage represents a relatively high intensity of light received by a photodetector and a relatively low voltage represents a relatively low light intensity received by a photodetector.

The image data generated by the photodetectors is transmitted to a processor. One of the functions of the processor is to create a data base or similar electronic structure that indicates the positions of the scan lines relative to the positions on the object from where the scan lines were generated. Alternatively, the data base may indicate the locations of the scan lines relative to each other. The data stored in the data base and the image data are used by the processor to replicate the image of the object. As an example, in the situation where the scanning device is generating image data representing a two-dimensional object, such as text printed on a sheet of paper, the hand-held scanning device may be moved in any direction on the paper. Accordingly, the scan line portions may be generated from virtually any location on the paper, which causes the image data representing the image of the object to consist of a plurality of scan line portions that may be skewed over the surface of the paper. In order to accurately replicate the image of the object, the hand held scanning device uses the data stored in the data base to determine the proper placement of the scan line portions of the image text printed on the paper. The processor may then create an electronic image of the text printed on the paper by known processing techniques, e.g., stitching software.

A problem replicating the image of the object is encountered if the velocity, position, or direction of movement of the scanning device relative to the object becomes unknown during the scanning process. For example, if the scanning device is imaging one thousand scan line portions of the image of the object per second and the scanning device is moving along a single axis at a constant rate of one inch per second relative to the object, each scan line represents one one-thousandth of an inch of the image of the object. If the correct velocity and thus, position, of the scanning device relative to the object has been conveyed to the processor, the processor will create a data base indicating that each scan line represents one one-thousandth of an inch of the image of the object. Alternatively, the processor will indicate that each scan line is located one one-thousandth of an inch from an adjacent scan line. Based on the image data and the data stored in the data base, the processor may accurately replicate the image of the object. If, however, the velocity of the scanning device relative to the object is decreased and the decreased velocity is not conveyed to the processor, the processor will continue to process the image data as though each scan line represents one one-thousandth of an inch of the object. Each scan line, however, will represent less than one one-thousandth of an inch of the object. Accordingly, the replicated image of the object will be compressed. If, on the other hand, the velocity of the scanning device relative to the object is increased and the increased velocity is not conveyed to the processor, the replicated image of the object will be expanded.

Accurately replicating an image of an object when either the velocity or position of the scanning device relative to the object becomes unknown is impossible. If the position or velocity is not known, the processor will not know where the scanning device is located relative to the object as the scan lines are being generated. Accordingly, the processor will not be able to properly place the scan line portions relative to each other so as to replicate the image of the object. This problem is exacerbated in hand-held scanning devices where the scan lines may be generated from anywhere on the object and are often skewed over the surface of the object.

In order to overcome these problems, scanning devices use position sensors to detect the position of the scanning device relative to the object. The position sensors output position information pertaining to the position of the scanning device relative to the object as the scan line portions of the image of the object are being generated. This position information is conveyed to the processor where it is incorporated into the above-described data base that is used for position sensing.

Some scanning devices have an optical sensor affixed to the scanning device to determine the position of the scanning device relative to the object being imaged. The optical sensor periodically generates image data representative of a small two-dimensional area of the object being imaged. A processor receives this image data and identifies distinct features in the image of the object. In the example where the object is text printed on a sheet of paper, the distinct features may be inherent irregularities in the surface of the paper. The positions of these distinct features relative to the optical sensor are stored in a memory device. As the scanning device is moved relative to the object, the positions of these distinct features move relative to the optical sensor. The processor compares the new positions of these distinct features to the positions stored in the memory device. Based on these comparisons, the processor is able to determine the position, direction of movement, and velocity of the scanning device to which the optical sensor is affixed relative to the object. Accordingly, the processor is able to create the above-described data base because the locations of the scan line portions of the image of the object relative to each other may be readily determined. It should be noted that some scanning devices use a plurality of optical sensors to better determine the position of the optical sensor relative to the object being imaged. Examples of imaging area portions of a surface to determine the position of an optical scanning device relative to the surface are further described in the following U.S. Pat. No. : 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NON-LINEAR MOVEMENT, which are both hereby incorporated by reference for all that is disclosed therein.

The images of some surfaces, however, do not have distinct features that are able to be imaged for purposes of determining the positions of the scanning device relative to the surfaces. For example, in the case where the surface of the object being imaged is smooth or glossy, such as with some photographs and magazine covers, there typically are not enough suitable distinct features in the image of the surface to achieve the above-described position sensing. Accordingly, the processor is unable to determine the location of the scanning device relative to the surface being imaged. Thus, the processor is unable to determine the locations from which the scan line portions are imaged. This results in the scanning device being unable to generate image data representative of these smooth or glossy surfaces.

Therefore, a need exists for an optical positioning system that is able to accurately determine its position relative to an object that has a smooth or glossy surface.

SUMMARY OF THE INVENTION

A method and system for determining the position of a first object relative to a second object are disclosed herein. The method may comprise providing a sheet wherein the sheet has a first surface that is contoured and a second surface that may or may not be contoured. The second surface of the sheet may be placed adjacent a surface of the second object so as to substantially conform to the surface of the second object. The method may further comprise providing an imaging system fixedly associated with the first object. The imaging system may be placed adjacent the sheet first surface and may be moved along with the first object relative to the sheet first surface. The imaging system images planar portions of the sheet first surface and identifies distinct features on the first surface and, additionally, identifies the locations of the images of the distinct features relative to the imaging system. As the first object and the imaging system are moved relative to the sheet first surface, the images of the distinct features relative to the imaging system move accordingly. The imaging system measures the amount and direction of the relative movement between the imaging system and images of the distinct features. The relative movement between the first object and the second object is then readily determined, which in turn, yields the position of the first object relative to the second object.

DETAILED DESCRIPTION OF THE INVENTION

Figure 1:
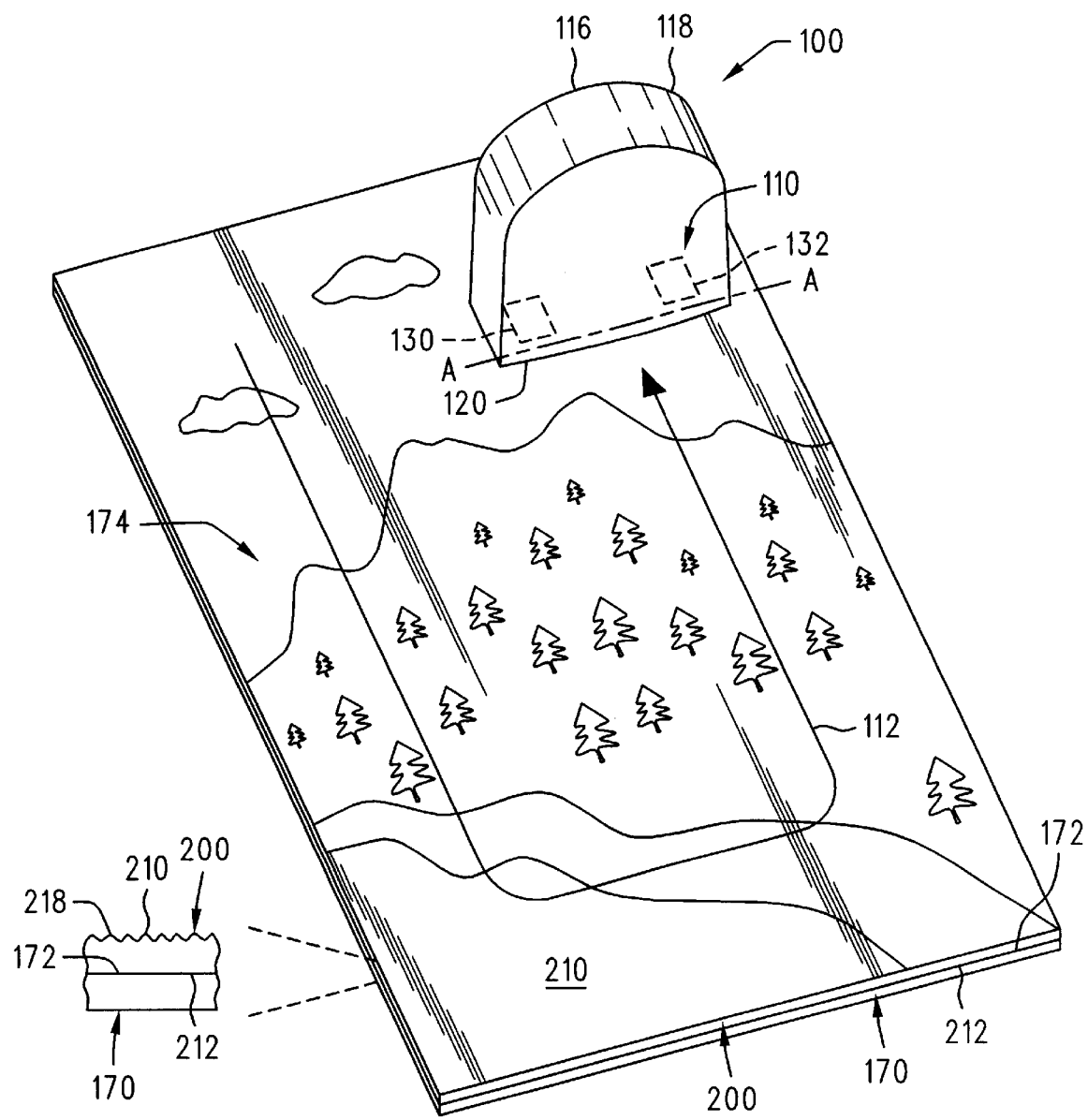
FIG. 1 is a top perspective view of an optical scanning device imaging a surface of a smooth object.

FIGS. 1 through 4, in general, illustrate a method for determining the position of a first object 100 relative to a second object 170, the method comprising: providing an imaging system 144 operatively associated with the first object 100; providing a sheet 200 having a first surface 210 and a second surface 212 wherein the sheet 200 includes at least one optically detectable feature 218; positioning the sheet 200 adjacent the second object 170; causing relative movement between the first object 100 and the sheet 200; generating image data with the imaging system 144 representative of successive portions 130 of the sheet first surface 210 as the first object 100 is moved relative to the sheet first surface 210; performing an analysis on the image data to determine the position of the first object 100 relative to the second object 170.

FIGS. 1 through 4 also, in general, illustrate a method of generating image data representative of an image of an object 170 comprising: providing a first imaging system 150; providing a second imaging system 154, wherein the second imaging system 154 is fixedly associated with the first imaging system 150; providing a sheet 200 having a first surface 210 and a second surface 212, wherein the sheet 200 includes at least one optically detectable feature 218; positioning the sheet second surface 212 adjacent the object 170; positioning the first imaging system 150 and the second imaging system 154 adjacent the sheet first surface 210; causing relative movement between the first imaging system 150 and the sheet first surface 210; causing relative movement between the second imaging system 154 and the sheet first surface 210 that is proportional to the relative movement between the first imaging system 150 and the sheet first surface 210; generating image data representative of the object 170 with the first imaging system 150; generating image data representative of the at least one optically detectable feature 218 with the second imaging system 154; performing an analysis on the image data generated by the second imaging system 154 to determine the position of the first imaging system 150 relative to the object 170.

FIGS. 1 through 4 also, in general, illustrate an imaging system comprising: an optical imaging device 100 having a first imaging system 150 and a second imaging system 154; a sheet 200 having a first surface 210 and a second surface 212; wherein the sheet 200 includes at least one optically detectable feature 218; the first imaging system 150 for generating image data representative of an image of an object 170 and the second imaging system 154 for generating image data representative of area portions 130 of the sheet 200 to determine the position of the optical imaging device 100 relative to the sheet 200; and the first imaging system 150 being substantially oblivious to the sheet 200; the second imaging system 154 being not substantially oblivious to the sheet 200.

Having generally described the method of determining the position of a first object relative to a second object and having generally described the scanning device 100, they will now be described in greater detail. Referring to FIG. 1, the following description focuses on a non-limiting imaging process using the scanning device 100 to image a surface 172 of a material 170. The method of determining the position of a first object relative to a second object is described within the imaging process wherein the first object is the scanning device 100 and the second object is the material 170. The following description summarizes the scanning process and is followed by a more detailed description of the scanning process incorporating a sheet 200.

The process incorporating a sheet 200. The scanning device 100 is illustrated in FIG. 1 generating machine-readable image data, sometimes referred to simply as image data, representative of an image 174 printed on the surface 172 of the material 170.

The process of generating image data representative of an object is sometimes referred to herein as imaging or scanning the object. It should be noted that the process of imaging the image 174 inherently includes imaging the surface 172.

The scanning device 100, in summary, may generate image data representative of a scan line portion 110 of the surface 172 of the material 170. The scan line portion 110 is illustrated in FIG. 1 as being located on a reference line AA on the surface 172. The position of the scan line portion 110 is fixed relative to the scanning device 100, thus, as the scanning device 100 moves relative to the surface 172, the position of the scan line portion 110 relative to the surface 172 moves accordingly. In order to generate image data representative of a larger portion of the surface 172 than the scan line portion 110, the scanning device 100 may be moved along a path 112 as the scanning device 100 generates image data representative of successive scan line portions 110 of the surface 172. The image data representative of the surface 172 is, thus, in the form of a plurality of scan line portions 110 skewed over the surface 172.

In addition to generating image data representative of the scan line portion 110, the scanning device 100 may generate image data representative of a first navigation portion 130 and a second navigation portion 132. In a conventional scanning process, the first navigation portion 130 and the second navigation portion 132 are planar portions of the surface 172 that are used to determine the position of the scanning device 100 relative to the material 170. The scanning device 100 is able to detect small distinct features in the images of the first navigation portion 130 and second navigation portion 132. For example, in the situation where the material 170 is made from pulp material, e.g., paper, the surface 172 typically has distinct features in the form of contours caused by the pulp material. The scanning device 100 detects and records the locations of these distinct features relative to the scanning device 100. As the scanning device 100 moves relative to the surface 172, the locations of the distinct features move relative to the scanning device 100. The scanning device 100 may then determine its rate of movement and location relative to the surface 172 by analyzing the movement of the distinct features relative to the scanning device 100. Examples of imaging area portions of a surface to determine the position of an optical scanning device relative to the surface are further described in the following U.S. Pat. No.: 5,644,139 of Allen et al. and U.S. Pat. No. 5,578,813 of Allen et al., both of which have been previously incorporated by reference for all that is disclosed therein.

The scanning device 100 uses the image data representative of the first navigation portion 130 and the second navigation portion 132 to determine the position of the scan line portion 110 relative to the surface 172 as image data is being generated. The scanning device 100 may then electronically tag the image data representative of the scan line portions 110 with position information which may identify the locations of the scan line portions 110 relative to each other. The scanning device 100 uses the position information to properly place the image data representative of the scan line portions relative to each other to replicate the image of the surface 172 in a conventional manner.

When the scanning device 100 operates under conventional scanning methods and images a smooth or glossy surface, the scanning device 100 is typically not able to detect the images of the above-described distinct features in the surface. This is due to a lack of imageable distinct features being located on the smooth or glossy surface. The inability of the scanning device 100 to image distinct features results in the scanning device 100 not being able to determine its velocity or position relative to the smooth or glossy surface. Accordingly, if image data representative of a plurality of scan line portions of the surface 172 is generated, the image data cannot be properly processed so as to replicate the image of the surface 172.

The method of scanning disclosed herein overcomes the above-described problems associated with imaging a smooth or glossy surface by the use of a transparent sheet 200. The method may comprise providing the sheet 200, wherein the sheet 200 may have a top surface 210 and a bottom surface 212, and wherein the top surface 210 may have optically detectable features located thereon. The optically detectable features shown herein are contours 218 located on the top surface 210. It is to be understood, however, that the optically detectable features may alternatively be located on the bottom surface 212, on both the bottom surface 212 and the top surface 210, or within the sheet 200 between the bottom and top surfaces 210, 212. The contours 218 are distinct features that may be imaged by the scanning device 100 via the first navigation portion 130 and the second navigation portion 132. The contours 218 may be formed on the top surface 210 in order to hold printing material such as ink. Alternatively, the contours 218 may be bumps or the like that may, as an example, be embossed into the top surface 210. The bumps or contours 218 may be electronically removed from the image data representative of the scan line portion 110 after imaging has been completed. The sheet 200 may pass visible light and, thus, may pass the image 174 printed on the surface 172 with minimal distortion of the image 174.

The method may further comprise placing the bottom surface 212 of the sheet 200 adjacent the surface 172 of the material 170 being imaged. The sheet 200 may be placed in a fixed position so that it will not move relative to the surface 172 of the material 170 during the scanning process. Additionally, the method may comprise placing the scanning device 100 adjacent the top surface 210 of the sheet 200 and causing relative movement between the scanning device 100 and the material 170. This relative movement between the scanning device 100 and the material 170 is the same relative movement as between the scanning device 100 and the sheet 200. During the scanning process, the scanning device 100 may follow the path 112, or a similar path on the sheet 200, in a conventional manner. Accordingly, the scanning device 100 generates image data representative of a plurality of scan line portions 110 of the surface 172 of the material 170. These scan line portions 110 include the image 174 printed on the surface 172 of the material 170. In order to process the image data so as to replicate the image 174 printed on the surface 172, the scanning device 100 must determine from where on the surface 172 the scan line portions 110 were generated. Accordingly, the scanning device 100 must be able to determine its position relative to the surface 172 of the material 170 as it generates image data.

Determining the position of the scanning device 100 relative to the surface 172 is achieved by imaging the first navigation portion 130 and the second navigation portion 132. In the scanning method disclosed herein, the first navigation portion 130 and the second navigation portion 132 are planar portions of the top surface 210 of the sheet 200. As described above, the sheet 200 is located in a fixed position relative to the material 170. Thus, the scanning device 100 images the distinct features on the top surface 210 of the sheet 200 in the same manner it would have had the distinct features been located on the surface 172 of the material 170. The image data representative of the first navigation portion 130 and the second navigation portion 132 is processed in a conventional manner to determine the position of the scanning device 100 relative to the transparent sheet 200. This position information is used to process the image data representative of the scan line portion 110 and to replicate the image of the surface 172 in a conventional manner as was described above.

Having summarily described the method of imaging and the scanning device 100, they will now be described in greater detail.

Referring to FIG. 1, the scanning device 100 described herein may be a conventional hand-held optical scanning device that generates image data representative of an image of an object. Examples of generating image data with hand-held optical scanning devices are disclosed in the following United States patents and patent applications, all of which have been previously referenced and incorporated for all that is disclosed therein: U.S. Pat. No. 5,552,597 of McConica; U.S. Pat. No. 5,646,394 of Steinle; U.S. Pat. No. 5,646,402 of Khovaylo et al.; U.S. Pat. No. 5,723,859 of Kerschner et al.; Ser. No. 09/120,641 of Sims et al.; and Ser. No. 09/120,637 of Sims et al.

The scanning device 100 described herein will be described as generating image data representative of the image 174 printed on the surface 172 of a material 170. The surface 172 of the material 170 may be smooth or glossy and may not provide distinct optical features such as the distinct optical features provided by pulp material used in the manufacture of a sheet of paper. The material 170 may, as an example, be a sheet of photographic paper and the image 174 may be a photograph printed thereon. Alternatively, the surface 172 may be glossy paper and the image 174 may be text printed thereon. It is to be understood that the process of imaging the image 174 inherently includes imaging the surface 172.

The sheet 200 may be fixedly positioned adjacent the surface 172 of the material 170 so as to be temporarily secured to the material 170. For example, the sheet 200 may be secured to the material 170 by frictional forces or adhesives, e.g., adhesive tape. The sheet 200 may have a top surface 210 and a bottom surface 212, wherein the bottom surface 212 may be positioned adjacent the surface 172 of the material 170. The top surface 210 of the sheet 200 may have contours 218 located thereon. The contours 218 may be irregularities in the top surface 210 that are similar to irregularities caused by pulp material in the surface of a sheet of paper.

The sheet 200 may be substantially transparent to visible light and the top surface 210 may substantially reflect infrared light. Thus, light representative of the surface 172, including the image 174, may pass through the sheet 200 and infrared light representative of the contours 218 may reflect from the top surface 210 of the sheet 200. The sheet 200 may, as an example, be a transparency commercially available from the Apollo Company of Ronkonkoma, N.Y. as either model number PP100C or CG7060. It should be noted that the thicknesses of the material 170 and the sheet 200 along with the size of the contours 218 illustrated in FIGS. 1 and 4 have been greatly enlarged for illustration purposes.

Figure 2:
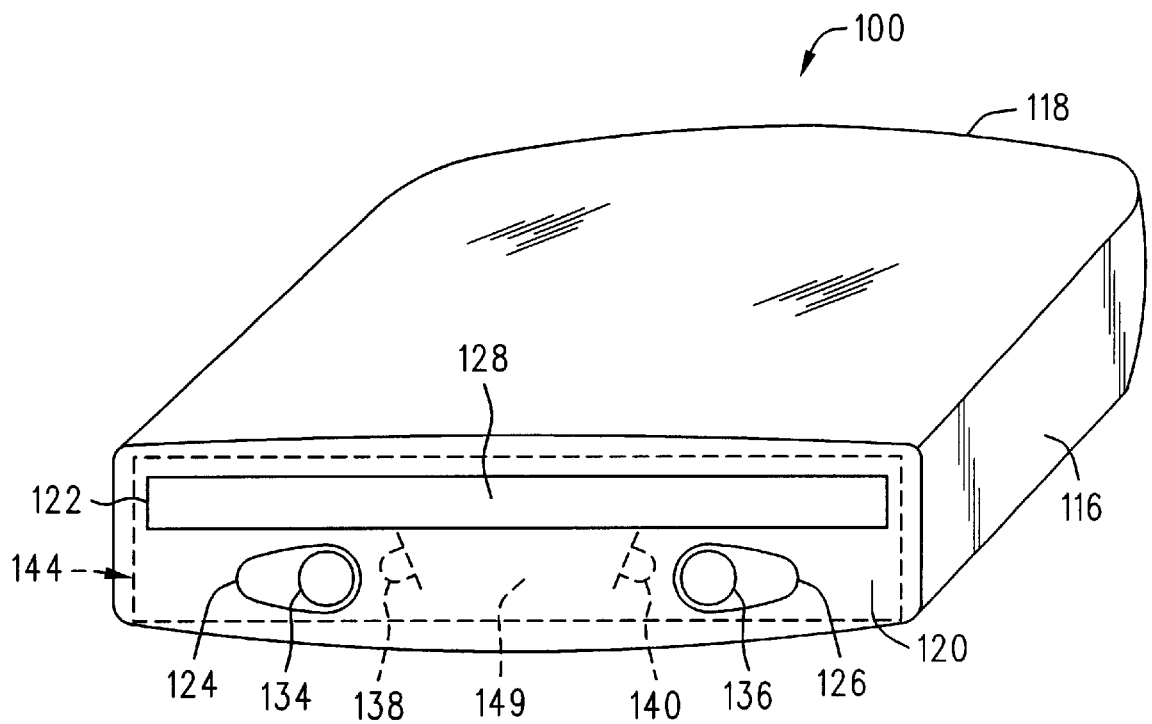
FIG. 2 is a bottom perspective view of the optical scanning device of FIG. 1.

Referring to FIG. 2, the scanning device 100 may have a housing 116 that serves to contain and support the components comprising the scanning device 100. For example, a printed circuit board 144, sometimes referred to as a substrate, may be located within the housing 116. The printed circuit board 144 is described in detail below with reference to FIG. 3. The housing 116 may have an upper portion 118 and a lower portion 120. The upper portion 118 may be configured to fit into a user's hand, thus, enhancing the hand-held concept of the scanning device 100. The lower portion 120 may be substantially planar so that it may be placed adjacent the top surface 210 of the sheet 200 during the scanning process. The lower portion 120, however, may be configured to other shapes depending on the shapes of objects the scanning device 100 is adapted to image. For example, the lower portion 120 may be concave to image cylindrically-shaped objects.

The lower portion 120 of the housing 116 may have several openings formed therein to accommodate the passage of light between the interior of the housing 116 and the object being scanned. A first opening 122 may be substantially rectangular and may serve to allow imaging light to pass from the scan line portion 110, FIG. 1, of the surface 172 into the interior of the housing 116 as described below. The first opening 122 may further serve to pass light from the scanning device 100 to the scan line portion 110 of the surface 172 in order to illuminate the scan line portion 110. A second opening 124 and a third opening 126 may be substantially round and may serve to allow light reflected from the first navigation portion 130, FIG. 1, and the second navigation portion 132 on the top surface 210 of the sheet 200 to pass into the interior of the housing 116 as described below. The second opening 124 and the third opening 126 may further serve to allow light to pass from the scanning device 100 to the first navigation portion 130, FIG. 1, and the second navigation portion 132 in order to illuminate the first navigation portion 130 and the second navigation portion 132. An imaging lens 128 may be located in the first opening 122 and may serve to focus light reflected from the scan line portion 110, FIG. 1, onto optical components used for imaging as described below. The imaging lens 128 may, as an example, be a gradient index lens array with a magnification of plus one. A first navigation lens 134 and a second navigation lens 136 may be located in the second opening 124 and the third opening 126 respectively. The first navigation lens 134 and the second navigation lens 136 may serve to focus light reflected from the first navigation portion 130, FIG. 1, and the second navigation portion 132 onto optical components used for position sensing as described below.

A first navigator light source 138 and a second navigator light source 140 may be located in the housing 116 in the proximity of the second opening 124 and the third opening 126 respectively. The first navigator light source 138 may serve to illuminate the first navigation portion 130, FIG. 1, by emitting light through the second opening 124 as described below. Likewise, the second navigator light source 140 may serve to illuminate the second navigation portion 132, FIG. 1, by emitting light through the third opening 126. The first navigator light source 138 and the second navigator light source 140 may emit light having wavelengths in the infrared light band.

Figure 3:
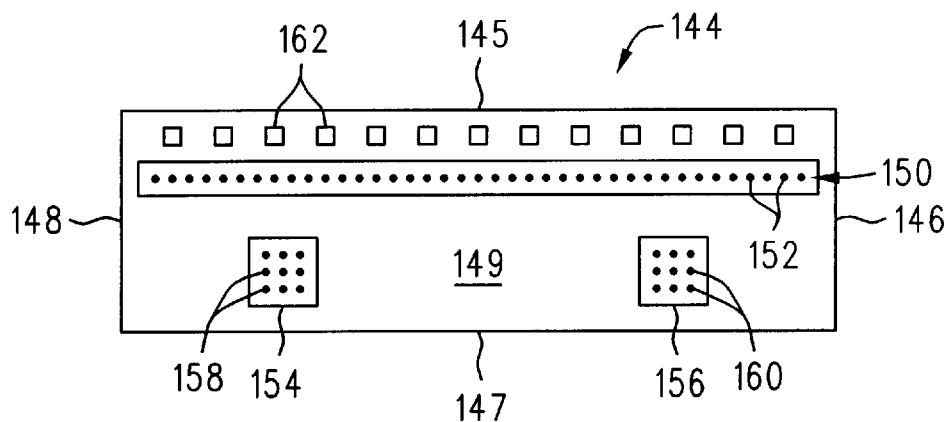
FIG. 3 is a schematic illustration of a printed circuit board incorporated into the optical scanning device of claim 1.

Referring to FIG. 3, which is a top view of the printed circuit board 144 of FIG. 2, the majority of optical components of the scanning device 100, FIG. 2, may be located on the printed circuit board 144. The printed circuit board 144 is sometimes referred to as a substrate. The printed circuit board 144 may have a top side 145, a right side 146, a bottom side 147, and a left side 148. The boundaries of the sides 145–148 may define a surface 149 to which the aforementioned optical components are mechanically and electrically connected. Other components used to facilitate scanning may also be electrically and mechanically connected to the surface 149. For example, devices to regulate voltages and facilitate the transfer of data may be electrically and mechanically connected to the surface 149.

A plurality of Light-emitting diodes 162 (LEDs) may be electrically and mechanically connected to the surface 149 of the printed circuit board 144 in the proximity of the top side 145. The LEDs 162 may emit light having wavelengths in the visible light band. As described below, the LEDs 162 may serve to illuminate the scan line portion 110, FIG. 1. It should be noted that light sources other than LEDs may serve to illuminate the scan line portion 110, FIG. 1.

A photodetector array 150 may be electrically and mechanically connected to the surface 149 of the printed circuit board 144. As described below, the photodetector array 150 may serve to convert the image of the scan line portion 110, FIG. 1, to image data in a conventional manner. The photodetector array 150 may comprise a plurality of linearly aligned photodetector elements 152, sometimes referred to herein simply as photodetectors. The photodetector array 150 may extend between the proximity of the left side 148 and the proximity of the right side 146 of the printed circuit board 144. Groups of linearly arranged photodetectors 152 may be located on a plurality of segments, not shown, wherein the segments are linearly arranged to form the linear alignment of photodetectors 152. The segments may, as an example, be of the type commercially available from Texas Advanced Optoelectronics Solutions, Inc. of Plano, Tex. as model number TSL2301.

A first navigator 154 and a second navigator 156 may also be electrically and mechanically connected to the surface 149 of the printed circuit board 144. The first navigator 154 may comprise a two-dimensional array of photodetectors 158. Likewise, the second navigator 156 may comprise a two-dimensional array of photodetectors 160. The first navigator 154 and the second navigator 156 may, as an example, have two-dimensional arrays comprising 48 rows of 48 photodetectors 158, 160. The photodetectors 158, 160 shown in FIG. 3 have been greatly enlarged for illustration purposes. As described below, the first navigator 154 and the second navigator 156 may serve to generate image data representative of the first navigation portion 130, FIG. 1, and the second navigation portion 132 respectively.

Figure 4:
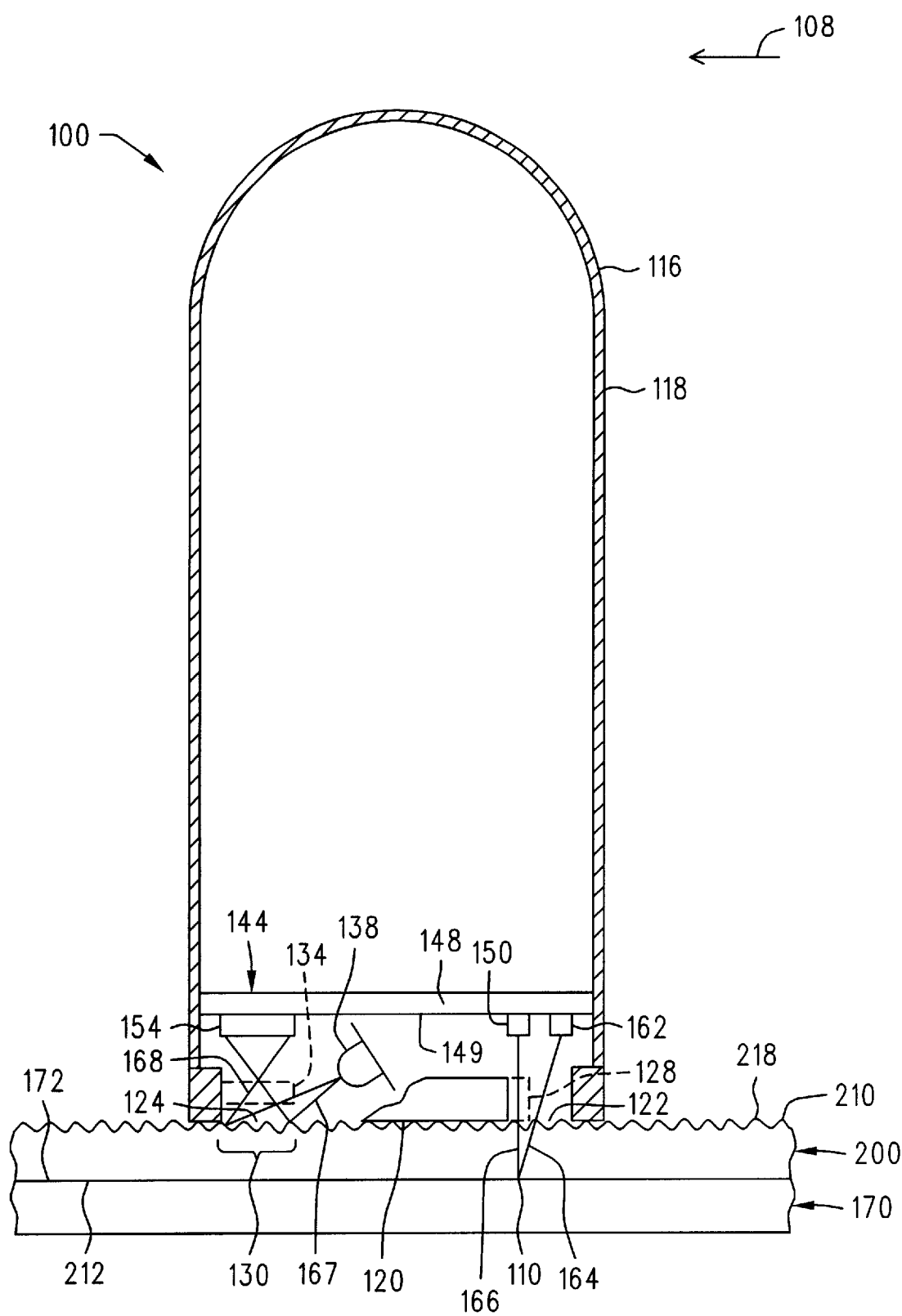
FIG. 4 is a side cut away view of the optical scanning device imaging the surface of the object of FIG. 1.

Having individually described the scanning device 100, FIG. 1, the material 170, and the sheet 200, their association to each other will now be described. The association of the components is illustrated in FIG. 4, which is a side cutaway view of the scanning device 100, the sheet 200, and the material 170. It should be noted that the size of the scanning device 100, the sheet 200, and the material 170 illustrated in FIG. 4 have been greatly enlarged for illustration purposes. It should further be noted that the side view of FIG. 4 illustrates the scan line portion 110 as a point and the first navigation portion 130 as a line segment. The second navigation portion 132, FIG. 1, is not illustrated in FIG. 4.

Several light beams used for position sensing and imaging are illustrated in FIG. 4. An imaging incident light beam 164 may be emitted by the LEDs 162 and may pass through the first opening 122 to illuminate the scan line portion 110 on the surface 172 of the material 170. An imaging reflection light beam 166 may reflect from the scan line portion 110 and may pass through the first opening 122, through the imaging lens 128, and may intersect the photodetector array 150. The imaging reflection light beam 166 may be representative of the image of the scan line portion 110. A navigation incident light beam 167 may be emitted by the first navigator light source 138 and may pass through the second opening 124 to illuminate the first navigation portion 130 on the top surface 210 of the sheet 200. A navigation reflection light beam 168 may reflect from the first navigation portion 130 and may pass through the second opening 124, through the first navigation lens 134, and may intersect the first navigator 154. The navigation reflection light beam 168 may be representative of an image of the first navigation portion 130. Similar light beams, not shown, may be present with regard to the second navigation portion 132, FIG. 1, and the second navigator 156, FIG. 3.

As illustrated in FIG. 4, the lower portion 120 of the scanning device 100 may contact the top surface 210 of the sheet 200 and the bottom surface 212 of the sheet 200 may contact the surface 172 of the material 170. It is to be understood that spaces may exist between the lower portion 120 of the scanning device 100 and the top surface 210 of the sheet 200 along with the bottom surface 212 of the sheet 200 and the surface 172 of the material 170. These spaces are not preferred because they may cause the image of the scan line portion 110, the first navigation portion 130, or the second navigation portion 132, FIG. 1, to be out of focus. The scanning device 100, however, may be able to operate with the spaces present.

Having described the scanning device 100 and its association with the material 170 and the sheet 200, the process of generating image data representative of the surface 172 of the material 170 will now be described.

In a conventional scanning process, the sheet 200 is not present and the lower portion 120 of the scanning device 100 is positioned adjacent the surface 172 of the material 170. The conventional scanning process, in summary, consists of generating image data representative of a plurality of scan line portion 110 of the surface 172 of the material 170. Simultaneous to the generation of image data representative of the scan line portions 110, the scanning device 100 generates image data representative of area portions of the surface 172 of the material 170. The area portions are substantially similar to the first navigation portion 130 and second navigation portion 132 located on the top surface 210 of the sheet 200. A processor, not shown, analyzes the image data representative of the area portions and identifies distinct features in the surface 172 of the material 170. The processor further identifies the locations of these distinct features relative to the first navigator 154 and the second navigator 156, FIG. 3. As the scanning device 100 moves relative to the surface 172 of the material 170, the locations of the distinct features move relative to the first navigator 154 and the second navigator 156, FIG. 3. Based on the movement of the distinct features relative to the first navigator 154 and the second navigator 156, the processor is able to determine the movement of the scanning device 100 relative to the surface 172 of the material 170. The processor is then able to determine the locations from where the scan line portions 110 were generated. This information is used by the processor to replicate the image of the surface 172 of the material 170. Examples of imaging area portions of a surface to determine the position of an optical scanning device relative to the surface are further described in the following U.S. Pat. No.: 5,644,139 of Allen et al. and U.S. Pat. No. 5,578,813 of Allen et al., which have both been previously referenced and incorporated herein.

The above-described conventional scanning process works well when the surface 172 has distinct features located thereon. The process, however, does not work well when the surface 172 does not have distinct features located thereon. In the example illustrated herein, the surface 172 of the material 170 does not have distinct features that are readily imageable by the first navigator 154 and the second navigator 156, FIG. 3. For example, the surface 172 may be a smooth or glossy surface that has few, if any, distinct features. Accordingly, the first navigator 154, the second navigator 156, FIG. 3, and the processor associated therewith are unable to determine the position of the scanning device 100 if the scanning device 100 is positioned directly on the surface 172.

A user may readily determine if the surface 172 is too smooth or glossy to image by attempting to image the surface 172 without the sheet 200 located thereon. If the replicated image of the surface 172 is not representative of the actual image of the surface 172, then the user may conclude that the surface 172 is too smooth or glossy to image. Alternatively, the scanning device 100 may be configured to generate a signal for the user indicating that an error in the scanning process has occurred. For example, if the processor determines that the image data generated by the photodetector array 150 is changing, the processor can conclude that there is relative movement between the scanning device 100 and the surface 172 of the material 170. If, however, the image data generated by the first navigator 154 and the second navigator 156, FIG. 3, is not changing, the processor can conclude that an error is occurring. More specifically, the error conclusion is made because the image data generated by the photodetector array 150, the first navigator 154, and the second navigator 156, FIG. 3, should change simultaneously. Accordingly, an error message may be sent to the user indicating that the surface being imaged may be too smooth or glossy to image.

When the surface 172 is too smooth or glossy to image, the user places the sheet 200 on the surface 172. In order to generate the most accurate image data, the bottom surface 212 of the sheet 200 is positioned adjacent the surface 172 of the material 170. Friction or, alternatively, an adhesive may be used to eliminate any relative movement between the sheet 200 and the material 170. When the sheet 200 is properly positioned relative to the material 170, the lower portion 120 of the scanning device 100 is then positioned adjacent the top surface 210 of the sheet 200. As described above, ideally, the lower portion 120 of the scanning device 100 contacts the top surface 210 of the sheet 200.

During the imaging process, the LEDs 162 emit the imaging incident light beam 164, which passes through the first opening 122 and through the sheet 200 to illuminate the scan line portion 110 of the surface 172. The imaging reflection light beam 166 reflects from the scan line portion 110 and is representative of the image of the scan line portion 110. The imaging reflection light beam 166 passes through the sheet 200, through the first opening 122, and is focused by the imaging lens 128 onto the photodetector array 150. The image of the scan line portion 110 focused onto the photodetector array 150 is then converted to image data and processed in a conventional manner. As described above, in the preferred embodiment of the scanning device 100, the imaging incident light beam 164 has wavelengths in the visible light band and the sheet 200 is substantially transparent to wavelengths of light in the visible light band. Accordingly, the image of the scan line portion 110 focused onto the photodetector array 150 is not significantly distorted by the sheet 200 and is a very accurate representation of the actual image of the scan line portion 110.

Simultaneous to the above-described imaging of the scan line portion 110, the scanning device 100 images the first navigation portion 130, and the second navigation portion 132, FIG. 1. The first navigator light source 138 emits the navigation incident light beam 167, which passes through the second opening 124 to illuminate the first navigation portion 130 on the top surface 210 of the sheet 200. The navigation reflection light beam 168 reflects from the first navigation portion .130 and is representative of an image of the first navigation portion 130, including distinct features located in the first navigation portion 130. The navigation reflection light beam 168 passes through the second opening 124 and is focused by the first navigation lens 134 onto the first navigator 154. The image of the first navigation portion 130 is then converted to image data by the first navigator 154 and processed in a conventional manner. An image of the second navigation portion 132, FIG. 1, is focused onto the second navigator 156, FIG. 3, in a similar manner as described above with regard to the first navigation portion 130 and the first navigator 154. As described above, the first navigator light source 138 and the second navigator light source 140, FIG. 2, may emit infrared light and infrared light may substantially reflect from the top surface 210 of the sheet 200. Infrared light sources such as the first navigator light source 138 and the second navigator light source 140, FIG. 2, emit a sufficient intensity of light without the need of substantial power requirements. Accordingly, infrared light sources enhance the portability of the scanning device 100.

During the scanning process, the scanning device 100 is moved in a direction 108 relative to the sheet 200 and the material 170. The direction 108 is for illustration purposes and it is to be understood that the scanning device 100 may move in other directions relative to the sheet 200. As the scanning device 100 is moved, the locations of the scan line portion 110, the first navigation portion 130, and the second navigation portion 132, FIG. 1, relative to the material 170 and the sheet 200 move accordingly. The first navigator 154 and the second navigator 156, FIG. 3, continually image the first navigation portion 130 and the second navigation portion 132, FIG. 1. The image data generated by the first navigator 154 and the second navigator 156, FIG. 3, is continually analyzed to record the position of the scanning device 100 relative to the surface 172 of the material 170. Every time the scanning device 100 moves a specific distance relative to the top surface 210 of the sheet 200, the scanning device 100 generates image data representative of the image of another scan line portion 110 of the surface 172. This process continues until a desired portion of the image of the surface 172 of the material 170 has been converted to image data.

The image data generated by the photodetector array 150, the first navigator 154, and the second navigator 156 is processed in a conventional manner. For example, processing may include determining the position of the scanning device 100 relative to the surface 172 of the material 170. Processing may further include electronically tagging image data generated by the photodetector array 150 with position information. During replication of the image of the surface 172, the image data representing the scan lines are processed to accurately represent the image of the surface 172 based on the position information.

Other embodiments of the scanning device 100 and method described above may be employed. Some of these embodiments are described below.

Referring to FIG. 4, the first navigator light source 138 and the second navigator light source 140, FIG. 2, have been described emitting infrared light. Infrared light was illustrated over other light sources because a relatively small light emitting element is typically able to emit a sufficient intensity of infrared light to illuminate the top surface 210, FIG. 4, of the sheet 200. It is to be understood, however, that other wavelengths of light may be used to illuminate the surface 172, FIG. 4, of the material 170. For example, visible light may be used to illuminate the surface 172.

Referring to FIG. 1, the sheet 200 has been described herein having a top surface 210 and a bottom surface 212 wherein the top surface 210 is contoured. It is to be understood, however, that the top surface 210 may be relatively smooth and the bottom surface 212 may be contoured. In the situation where the bottom surface 212 is contoured, the sheet 200 itself passes the navigation incident light beam 167 and the bottom surface 212 reflects the navigation incident light beam 167. Thus, the navigation reflection light beam 168 is representative of the contoured bottom surface 212. It is to be further understood that both the top surface 210 and the bottom surface 212 may be contoured. Additionally, it is to be understood that the contours may be other optically detectable features.

The surface 172 of the material 170 has been described herein as being a smooth or glossy surface. It is to be understood, however, that the surface 172 may be any surface that does not have sufficient imageable distinct features to accomplish position sensing. It is also to be understood that the use of the sheet 200 may serve to protect the object being imaged during the scanning process. For example, the sheet 200 will prevent the scanning device 100 from scratching the surface 172 of the material 170.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method for determining the position of a first object relative to a second object, said method comprising:

providing an imaging system operatively associated with said first object;

providing a transparent sheet having at least one optically detectable contour located thereon;

positioning said sheet adjacent said second object and between said first object and said second object;

causing relative movement between said first object and said sheet while maintaining the position of said sheet relative to said second object;

generating image data using said imaging system representative of said at least one optically detectable contour as said first object is moved relative to said sheet; and analyzing said image data to determine the position of said first object relative to said second object.

2. The method of claim 1 and further comprising analyzing said image data to determine the velocity of said first object relative to said second object.

3. The method of claim 1 and further comprising:

providing a light source associated with said first object; and illuminating said at least one optically detectable contour with light emitted from said light source.

4. The method of claim 3 wherein said at least one optically detectable contour reflects light in the infrared light band and wherein said light source emits light in the infrared light band.

5. The method of claim 1 wherein said imaging system is a two-dimensional imaging system.

6. The method of claim 1 wherein said imaging system comprises a two-dimensional array of photodetecting elements.

7. The method of claim 1 wherein said first object is an optical scanning device.

8. The method of claim 1 wherein said second object is comprised of a paper product.

9. The method of claim 1 wherein said second object is a photograph.

10. The method of claim 1, wherein said sheet further comprises a first surface and a second surface, wherein said at least one optically detectable contour comprises a plurality of contours on at least one of said first and second surfaces.

11. The method of claim 10, said sheet further comprising a first surface and a second surface, wherein said image data is generated by said imaging system, and wherein said image data is representative of successive area portions of said at least one of said first and second surfaces as said first object is moved relative to said sheet.

12. A method of generating image data representative of an image of an object comprising:

providing a first imaging system;

providing a second imaging system, said second imaging system being fixedly associated with said first imaging system;

providing a transparent sheet having a first surface and a second surface wherein said sheet includes at least one optically detectable contour;

positioning said sheet first surface adjacent said object;

positioning said first imaging system and said second imaging system adjacent said sheet second surface;

causing relative movement between said first imaging system and said sheet, while maintaining the position of said sheet relative to said object constant;

causing relative movement between said second imaging system and said sheet that is proportional to said relative movement between said first imaging system and said sheet, while maintaining the position of said sheet relative to said object constant;

generating image data representative of said object using said first imaging system;

generating image data representative of said at least one optically detectable contour using said second imaging system; and analyzing said image data generated by said second imaging system to determine the position of said first imaging system relative to said object.

13. The method of claim 12 wherein said first imaging system is a linear imaging system.

14. The method of claim 12 wherein said first imaging system comprises a linear array of photodetecting elements.

15. The method of claim 12 wherein said second imaging system is a two-dimensional imaging system.

16. The method of claim 12 wherein said second imaging system comprises a two-dimensional array of photodetecting elements.

17. The method of claim 12 and further comprising:

providing a first light source associated with said first imaging system; and illuminating said object using said first light source.

18. The method of claim 17 wherein said sheet is substantially transparent to visible light and wherein said first light source emits light in the visible light band.

19. The method of claim 12 and further comprising:

providing a second light source associated with said second imaging system; and illuminating said at least one optically detectable contour using said second light source.

20. The method of claim 19 wherein said at least one optically detectable contour reflects light in the infrared light band and wherein said second light source emits light in the infrared light band.

21. The method of claim 12 wherein said generating image data using said second imaging system comprises generating image data using said second imaging system representative of successive area portions of said at least one optically detectable contour.

22. The method of claim 12 and further comprising:

providing a housing; and locating said first imaging systems and second imaging systems whithin said housing.

23. The method of claim 12 and further comprising removing image data representative of said at least one optically detectable contour from said image data representative of said object.

24. The method of claim 12 wherein said at least one optically detectable contour comprises a plurality of contours.

25. An imaging system comprising:

an optical imaging device having a first imaging system and a second imaging system;

a transparent sheet having at least one optically detectable contour;

wherein said first imaging system is adapted to generate image data representative of an image of an object and said second imaging system is adapted to generate image data representative of area portions of said sheet to determine the position of said optical imaging device relative to said sheet;

wherein said first imaging system is substantially oblivious to said at least one optically detectable contour; and wherein said second imaging system is not substantially oblivious to said at least one optically detectable contour.

26. The imaging system of claim 25 wherein said object has a surface and wherein said sheet is substantially conformed to said object surface.

27. The imaging system of claim 25 wherein said at least one optically detectable contour comprises a plurality of contours.

* * * * *

UNITED STATES PATENT AND TRADEMARK OFFICE
CERTIFICATE OF CORRECTION

PATENT NO. : 6,414,293 B1
DATED : July 2, 2002
INVENTOR(S) : Thomas C. Oliver

It is certified that error appears in the above-identified patent and that said Letters Patent is hereby corrected as shown below:

Column 5,
Line 26, delete "The process incorporating a sheet 200."

Column 16,
Lines 6 and 7, delete "systems" and insert therefor -- system --
Line 7, delete "whithin" and insert therefor --within --.

Signed and Sealed this

Eighteenth Day of May, 2004

JON W. DUDAS
*Acting Director of the United States Patent and Trademark Office*